US009605964B2

United States Patent
Ge et al.

(10) Patent No.: US 9,605,964 B2
(45) Date of Patent: Mar. 28, 2017

(54) GYRO QUADRATURE STABALIZATION WITH DEMODULATION PHASE ERROR NULLING

(71) Applicant: The Boeing Company, Chicago, IL (US)

(72) Inventors: Howard H. Ge, Hacienda Heights, CA (US); Anthony Dorian Challoner, Manhattan Beach, CA (US)

(73) Assignee: The Boeing Company, Chicago, IL (US)

( * ) Notice: Subject to any disclaimer, the term of this patent is extended or adjusted under 35 U.S.C. 154(b) by 548 days.

(21) Appl. No.: 14/147,260

(22) Filed: Jan. 3, 2014

(65) Prior Publication Data

US 2015/0192415 A1 Jul. 9, 2015

(51) Int. Cl.
*G01C 19/00* (2013.01)
*G01C 19/5684* (2012.01)
*G01C 19/5776* (2012.01)

(52) U.S. Cl.
CPC ..... *G01C 19/5684* (2013.01); *G01C 19/5776* (2013.01)

(58) Field of Classification Search
USPC ......................................... 73/504.13, 504.12
See application file for complete search history.

(56) References Cited

U.S. PATENT DOCUMENTS

| | | | | |
|---|---|---|---|---|
| 5,419,194 A | * | 5/1995 | Varnham | G01C 19/5691 73/504.13 |
| 5,552,919 A | * | 9/1996 | Majima | H01S 5/5045 398/213 |
| 5,894,090 A | | 4/1999 | Tang | |
| 6,009,751 A | | 1/2000 | Ljung | |
| 6,282,958 B1 | | 9/2001 | Fell | |
| 6,501,340 B1 | * | 12/2002 | Flood | H03L 1/04 310/315 |
| 6,698,271 B1 | * | 3/2004 | Fell | G01C 19/567 73/1.37 |

(Continued)

OTHER PUBLICATIONS

Dong Joon Kim et al., "A Systematic Method for Tuning the Dynamics of Electrostatically Actuated Vibratory Gyros," Control Systems Technology, IEEE Transactions on (vol. 14 , Issue: 1 ), Jan. 2006, pp. 69-81.

(Continued)

*Primary Examiner* — Robert Huber
*Assistant Examiner* — Tarun Sinha
(74) *Attorney, Agent, or Firm* — Charles L. Moore; Moore & Van Allen PLLC (57) ABSTRACT

A gyroscope system may include a disc resonator gyroscope including a plurality of electrodes embedded in the disc resonator gyroscope. The electrodes may be configured for at least applying a drive voltage and a tuning voltage to the disc resonator gyroscope and for sensing operating parameters of the disc resonator gyroscope. The gyroscope system may also include a quadrature stabilization circuit configured to measure a quadrature error and generate a quadrature regulating voltage based on the quadrature error. The tuning voltage may be adjusted by the quadrature regulating voltage to cancel an effect of voltage flicker before being applied to a tuning electrode of the disc resonator gyroscope.

24 Claims, 8 Drawing Sheets

(56) References Cited

U.S. PATENT DOCUMENTS

| | | |
|---|---|---|
| 6,944,931 B2 | 9/2005 | Shcheglov |
| 7,040,163 B2 | 5/2006 | Shcheglov |
| 7,168,318 B2 | 1/2007 | Challoner |
| 7,347,095 B2 | 3/2008 | Shcheglov |
| 7,793,541 B2 | 9/2010 | Challoner |
| 8,205,495 B2 | 6/2012 | Challoner |
| 8,393,212 B2 | 3/2013 | Ge |
| 2008/0055023 A1* | 3/2008 | Gevorgian ............ H03B 5/326 333/235 |
| 2010/0089158 A1* | 4/2010 | Watson ............ G01C 19/5691 73/504.12 |
| 2011/0158297 A1* | 6/2011 | Ding ............ H03D 3/009 375/219 |
| 2014/0250970 A1* | 9/2014 | Fang ............ G01C 25/005 73/1.37 |
| 2015/0027198 A1* | 1/2015 | Sessego ............ G01P 15/125 73/1.37 |

OTHER PUBLICATIONS

Yen-Cheng Chen et al., "A Control and Signal Processing Integrated Circuit for the JPL-Boeing Micromachined Gyroscopes," Control Systems Technology, IEEE Transactions on (vol. 13, Issue: 2), Mar. 2005, pp. 286-300.

IEEE Standards Association, "1431-2004/Cor 1-2008—IEEE Standard Specification Format Guide and Test Procedure for Coriolis Vibratory Gyros," Corrigendum to IEEE Std 1672, 2004, <http://standards.ieee.org/reading/ieee/updates/errata/1431_Cor1-2008.pdf>, pp. 1-79.

* cited by examiner

GYRO QUADRATURE STABALIZATION WITH DEMODULATION PHASE ERROR NULLING

FIELD

The present disclosure relates to gyroscopes including disc resonator gyroscopes, and more particularly to gyroscope systems including gyro quadrature stabilization, demodulation phase error nulling and frequency stabilization.

BACKGROUND

Mechanical gyroscopes are used to determine direction of a moving platform based upon the sensed inertial reaction of an internally moving proof mass. A typical electromechanical gyroscope comprises a suspended proof mass, gyroscope case, pickoffs, or sensors, torquers, or actuators and readout electronics. The inertial proof mass is internally suspended from the gyroscope case that is rigidly mounted to the platform and communicates the inertial motion of the platform while otherwise isolating the proof mass from external disturbances. The pickoffs to sense the internal motion of the proof mass, the torquers to maintain or adjust this motion and the readout electronics that must be in close proximity to the proof mass are internally mounted to the case which also provides the electrical feedthrough connections to the platform electronics and power supply. The case also provides a standard mechanical interface to attach and align the gyroscope with the vehicle platform. In various forms gyroscopes are often employed as a critical sensor for vehicles such as aircraft and spacecraft. They are generally useful for navigation or whenever it is necessary to autonomously determine the orientation of a free object.

Older conventional mechanical gyroscopes were very heavy mechanisms by current standards, employing relatively large spinning masses. A number of recent technologies have brought new forms of gyroscopes, including optical gyroscopes such as laser gyroscopes and fiber optic gyroscopes as well as mechanical vibratory gyroscopes.

Spacecraft generally depend on inertial rate sensing equipment to supplement attitude control. Currently this is often performed with expensive conventional spinning mass gyros (e.g., a Kearfott inertial reference unit) or conventionally-machined vibratory gyroscopes (e.g. a Litton hemispherical resonator gyroscope inertial reference unit). However, both of these are very expensive, large and heavy.

In addition, although some prior symmetric vibratory gyroscopes have been produced, their vibratory momentum is transferred through the case directly to the vehicle platform. This transfer or coupling admits external disturbances and energy loss indistinguishable from inertial rate input and hence leads to sensing errors and drift. One example of such a vibratory gyroscope may be found in U.S. Pat. No. 5,894,090 to Tang et al. which describes a symmetric cloverleaf vibratory gyroscope design and is incorporated herein by reference in its entirety. Other planar tuning fork gyroscopes may achieve a degree of isolation of the vibration from the baseplate, however these gyroscopes lack the vibrational symmetry desirable for tuned operation.

In addition, shell mode gyroscopes, such as the hemispherical resonator gyroscope and the vibrating thin ring gyroscope, are known to have some desirable isolation and vibrational symmetry attributes. However, these designs are not suitable for or have significant limitations with thin planar silicon microfabrication. The hemispherical resonator employs the extensive cylindrical sides of the hemisphere for sensitive electrostatic sensors and effective actuators. However its high aspect ratio and 3D curved geometry is unsuitable for inexpensive thin planar silicon microfabrication. The thin ring gyroscope (e.g., U.S. Pat. No. 6,282,958, entitled "Angular Rate Sensor") while suitable for planar silicon microfabrication, lacks electrostatic sensors and actuators that take advantage of the extensive planar area of the device. Moreover, the case for this gyroscope is not of the same material as the resonator proof mass so that the alignment of the pickoffs and torquers relative to the resonator proof mass change with temperature, resulting in gyroscope drift.

Vibration isolation using a low-frequency seismic support of the case or of the resonator, internal to the case is described in U.S. Pat. No. 6,009,751, entitled "Coriolis Gyro Sensor." However such increased isolation comes at the expense of proportionately heavier seismic mass and/or lower support frequency. Both effects are undesirable for compact tactical inertial measurement unit (IMU) applications because of proof mass misalignment under acceleration conditions.

SUMMARY

In accordance with an embodiment, a gyroscope system may include a disc resonator gyroscope including a plurality of electrodes embedded in the disc resonator gyroscope. The electrodes may be configured for at least applying a drive voltage and a tuning voltage to the disc resonator gyroscope and for sensing operating parameters of the disc resonator gyroscope. The gyroscope system may also include a quadrature stabilization circuit configured to measure a quadrature error and generate a quadrature regulating voltage based on the quadrature error. The tuning voltage may be adjusted by the quadrature regulating voltage to cancel an effect of voltage flicker in the tuning voltage before the tuning voltage is applied to a tuning electrode of the disc resonator gyroscope.

In accordance with another embodiment, a gyroscope system may include a disc resonator gyroscope. The disc resonator gyroscope may include a plurality of electrodes embedded in the disc resonator gyroscope. The electrodes may be configured for at least applying a drive voltage and a tuning voltage to the disc resonator gyroscope and for sensing operating parameters of the disc resonator gyroscope. The gyroscope system may also include a demodulation phase tuning circuit configured to measure a demodulation phase angle error of the disc resonator gyroscope and to adjust a demodulation phase angle to about 90 degrees in response to the demodulation phase angle error. The gyroscope system may additionally include a quadrature stabilization circuit configured to measure a quadrature error and generate a quadrature regulating voltage based on the quadrature error. The tuning voltage is adjusted by the quadrature regulating voltage to cancel an effect of voltage flicker on the tuning voltage before the tuning voltage is applied to a tuning electrode of the disc resonator gyroscope.

In accordance with further embodiment, a method may include applying a drive voltage to a drive electrode of a disc resonator gyroscope and applying a tuning voltage to a tuning electrode of the disc resonator gyroscope. The method may also include measuring a demodulation phase angle error of the disc resonator gyroscope and adjusting a demodulation phase angle to about 90 degrees in response to the demodulation phase angle error measurement. The method may also include measuring a demodulation quadrature error and generating a quadrature regulating voltage based on the demodulation quadrature error. The method may further include adjusting the tuning voltage using the quadrature regulating voltage to cancel an effect of voltage flicker of the tuning voltage being applied to the tuning electrode.

BRIEF DESCRIPTION OF THE SEVERAL VIEWS OF DRAWINGS

The novel features believed characteristic of the illustrative embodiments are set forth in the appended claims. The illustrative embodiments, however, as well as a preferred mode of use, further objectives and further features thereof, will best be understood by reference to the following detailed description of illustrative embodiments of the present disclosure when read in conjunction with the accompanying drawings.

DETAILED DESCRIPTION

The following detailed description of embodiments refers to the accompanying drawings, which illustrate specific embodiments of the disclosure. Other embodiments having different structures and operations do not depart from the scope of the present disclosure. Like reference numerals may refer to the same element or component in the different drawings.

Embodiments of the disc resonator gyroscope use a combination of one or more feedback control techniques to more accurately estimate and maintain demodulation phase; minimize quadrature error; and stabilize frequency error compared to conventional gyroscopes for applications such as satellite control, terrestrial or handheld navigation systems. As a result, the control design of this disc resonator gyroscope achieves significant better performance (NAV grade performance) than conventional gyroscopes, allowing for use in inertial navigation systems.

Figure 1:
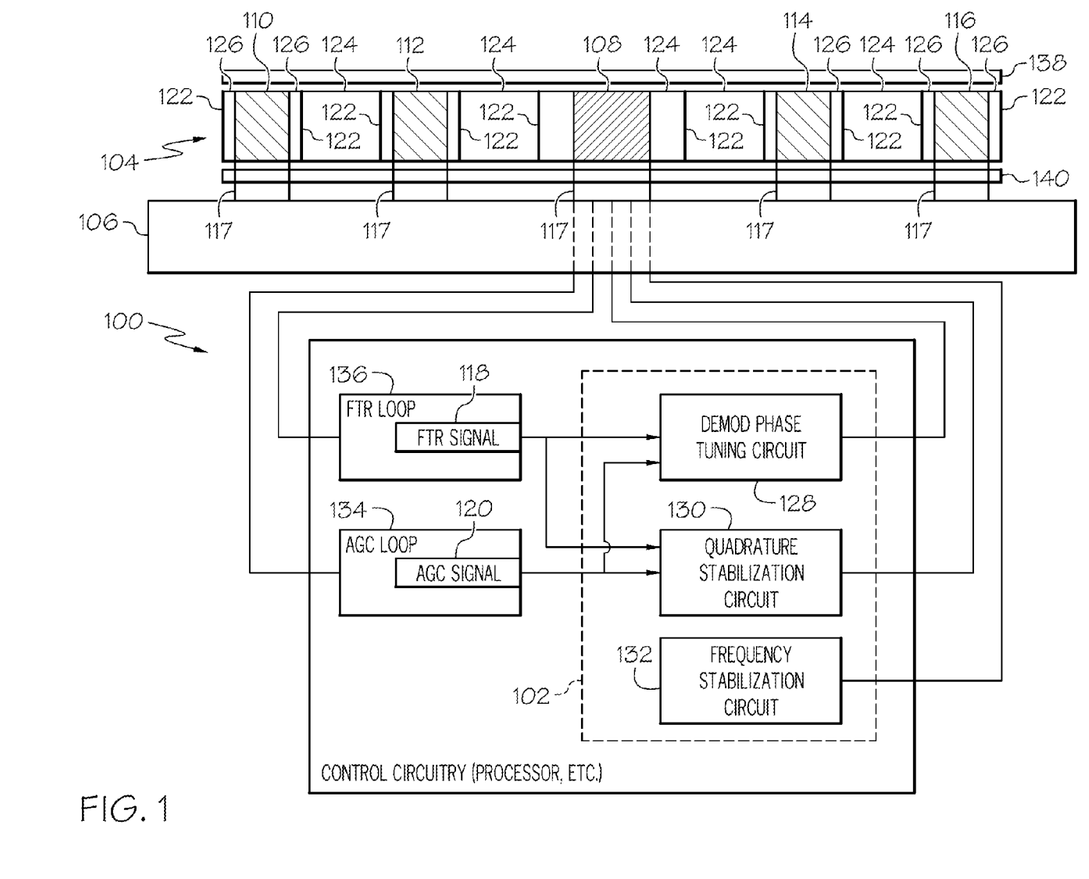
FIG. 1 is a side view of an example of a gyroscope system including a gyroscope quadrature stabilization and demodulation phase error nulling system in accordance with an embodiment of the present disclosure.

FIG. 1 is a schematic side view of an example of a gyroscope system 100 including a gyroscope quadrature stabilization and demodulation phase error nulling system 102 in accordance with an embodiment of the present disclosure. The gyroscope system 100 may include a disc resonator gyroscope 104. Disc resonator gyroscopes, such as disc resonator gyroscope 104 may also be referred to herein as a disc resonator, resonator or gyro. An example of a disc resonator gyroscope that may be used for disc resonator gyroscope 104 is described in U.S. Pat. No. 7,793,541, entitled "Planar Resonator Gyroscope Central Die Attachment," issued Sep. 14, 2010, which is assigned to the assignee as the present application and is incorporated herein by reference in its entirety.

The disc resonator gyroscope 104 may be assembled on a baseplate 106. A central support 108 may support the disc resonator gyroscope 104 on the baseplate 106. The disc resonator gyroscope 104 may include a plurality of embedded electrostatic electrodes 110-116 that may be used for excitation and sensing as described in more detail herein. The embedded electrostatic electrodes 110-116 may be supported on pillars 117 on the baseplate 106. For example, the plurality of embedded electrostatic electrodes may include drive electrodes 110 for applying a drive voltage or voltages that cause the disc resonator gyroscope 104 to spin. Tuning electrodes 112 may be provided for applying a tuning voltage or voltages for balancing the disc resonator gyroscope 104 and sensing electrodes 114 and 116 for sensing operating parameters of the disc resonator gyroscope 104. The sensed parameters may include but are not necessarily limited to a force-to-rebalance (FTR) signal 118 and automatic gain control (AGC) signal 120 and other sensed operating parameters that may be used for demodulation phase tuning, quadrature stabilization and frequency stabilization as described herein. The FTR signal 118 may be sensed from an FTR loop 136 or circuit associated with the disc resonator 104. The FTR loop 136 and FTR signal 118 control balancing or equilibrium of the disc resonator during operation. The AGC signal 120 may be sensed from an AGC loop 134 or circuit associated with the disc resonator 104. The AGC loop 134 and AGC signal 120 correspond to a drive loop and signal that cause the disc resonator 104 to vibrate at a prescribed frequency and maintains the vibration amplitude constant.

One or more additional electrodes 138 and 140 may be disposed adjacent to the disc resonator gyroscope 104. Although the electrodes 138 and 140 are shown as single elements above and below the disc resonator gyroscope 104, each electrode may comprise multiple distinct elements which may be independently controlled. The upper electrode 138 may be disposed on the inner surface of a housing (not shown in FIG. 1) enclosing the resonator while the lower electrode 140 may be disposed on the baseplate 106. The lower electrode 140 is limited to the available area between the embedded electrodes 110-116 and the rigid central support 108. The additional electrodes 138 and 140 may be used to enhance control of the disc resonator gyroscope 104. These capacitance electrodes 138 and 140 may be used for axial or angular acceleration measurement as well as active damping of the axial and rocking modes of the disc resonator gyroscope 104.

Figure 2:
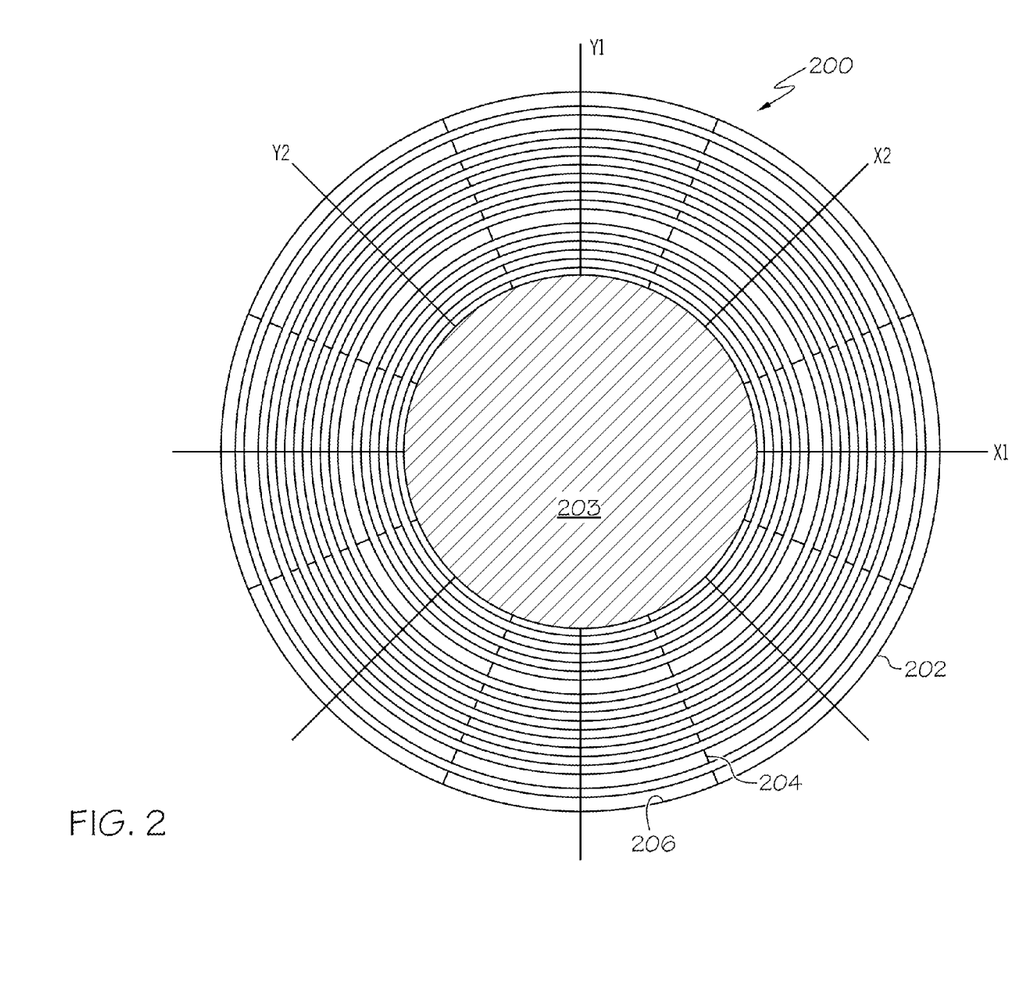
FIG. 2 is a top view of an example of a disc resonator gyroscope in accordance with an embodiment of the present disclosure.

Referring also to FIG. 2, FIG. 2 is a top view of an example of a disc resonator 200 in accordance with an embodiment of the present disclosure. The disc resonator 200 may be the same as disc resonator 104 in FIG. 1. The embedded electrostatic electrodes 110-116 (shown in FIG. 1) are formed along with the disc resonator 200 (104 in FIG. 1) by etching a wafer selectively bonded to the baseplate 106 in FIG. 1. The disc resonator 200 or 104 may be etched to form a plurality resonator rings 202 (122 in FIG. 1) or circumferential resonator segments that may be concentrically formed outward from the central support 203 or 108 in FIG. 1. The concentric resonator rings or circumferential segments 202 (122 in FIG. 1) may be interconnected by spokes or radial segments 204 (124 in FIG. 1) such that the through-etched sidewalls of the concentric resonator segments 202, 122 form capacitive gaps 206, 126 in FIG. 1 between the electrodes 110-116 and the disc resonator 104. The electrodes 110-116 and the disc resonator 104 remain separately bonded to the baseplate 106.

The gyroscope system 100 may include a demodulation phase tuning circuit 128 which may be component of the gyroscope quadrature stabilization and demodulation phase error nulling system 102. The demodulation phase tuning circuit 128 may be configured to measure a demodulation phase angle error of the disc resonator gyroscope 104 and to adjust the demodulation phase angle to about 90 degrees. Adjusting the demodulation phase angle to 90 degrees has the effect of decoupling an in-phase bias term and quadrature term of the equation of motion of the disc resonator gyroscope 104 as described in more detail herein. An example of a demodulation phase tuning circuit that may be used for the demodulation tuning circuit 128 will be described with reference to FIG. 4A.

The gyroscope system 100 may also include a quadrature stabilization circuit 130 which may also be a component of the gyroscope quadrature stabilization and demodulation phase error nulling system 102. The quadrature stabilization circuit 130 may be configured to measure a quadrature error of the operating disc resonator 104 and generate a quadrature regulating voltage based on the quadrature error. The tuning voltage is adjusted by the quadrature regulating voltage to cancel an effect of voltage flicker before the tuning voltage is applied to a tuning electrode 112 or electrodes of the disc resonator gyroscope 104. An example of a quadrature stabilization circuit that may be used for the quadrature stabilization circuit 130 will be described with reference to FIG. 4B.

The gyroscope system 100 may additionally include a frequency stabilization circuit 132 which may also be a component of the gyroscope quadrature stabilization and demodulation phase error nulling system 102. The frequency stabilization circuit 132 may be configured to maintain an operating frequency of the disc resonator gyroscope 104 substantially constant. By maintaining the operating frequency of the disc resonator gyroscope 104 substantially constant, the ambient temperature may be allowed to vary as much as plus or minus 50 degrees Centigrade without adversely affecting operation of the disc resonator gyroscope 104. An example of a frequency stabilization circuit that may be used for the frequency stabilization circuit 132 will be described with reference to FIG. 4C.

Figure 3A:
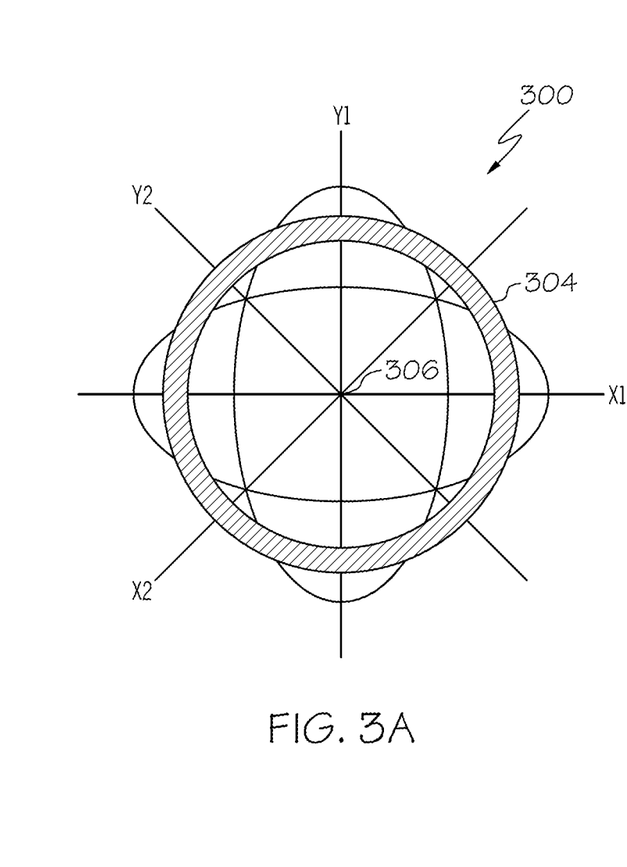
FIGS. 3A and 3B illustrate two second order in-plane vibration modes of a disc resonator gyroscope.
Figure 3B:
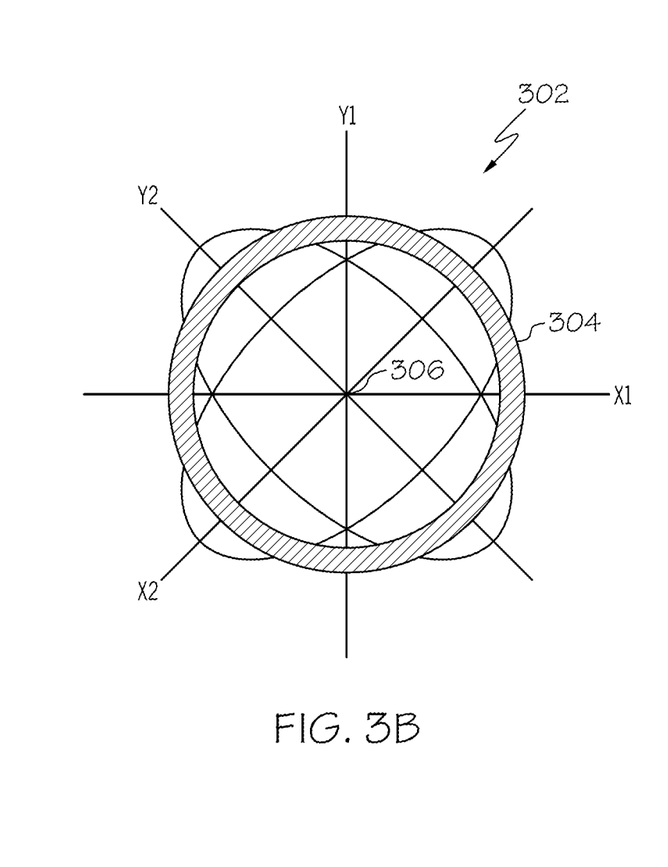

FIGS. 3A and 3B illustrate two second order in-plane vibration modes 300 and 302 of a disc resonator gyroscope, such as disc resonator gyroscope 104 in FIG. 1 or 200 in FIG. 2. The disc resonator gyroscope is illustrated by a ring 304 in FIGS. 3A and 3B. The second order in-plane vibration modes 300 and 302 of the disc resonator or disc resonator gyroscope 304 may be excited and sensed to measure an angular rate of the disc resonator gyroscope 304. The two second order in-plane vibration modes 300 and 302 of the disc resonator gyroscope 304 are spaced 45 degrees apart as illustrated in FIGS. 3A and 3B. The X2-Y2 axes are rotated 45 degrees from the X1-Y1 axes. In mode 1 (300 in FIG. 3A) the ring 304 or disc resonator gyroscope has a tendency to deform elliptically along the X1-Y1 axes in FIG. 3A. In mode 2 (302 FIG. 3B), the ring 304 or disc resonator gyroscope has a tendency to deform elliptically along the X2-Y2 axes. Analogous dynamic equations for these type of disc resonator gyroscopes (Coriolis Vibratory Gyro, or CVG) are described in IEEE Standard Specification Format Guide and Test Procedure for Coriolis Vibration Gyros, IEEE Std. 1431-2004, December 2004 doi: 10.1109/IEEESTD.2004.95744. Second printing, Oct. 9, 2008. The equation of motion that describes the coupling of the two in-plane modes 300 and 302 is:

$$M\ddot{\bar{x}} + C\dot{\bar{x}} + \Omega S\dot{\bar{x}} + K\bar{x} = \bar{f} \quad \text{(Eq. 1)}$$

where M, C, and K are each real positive definite 2×2 mass, damping, and stiffness matrices, respectively. $\Omega$ is the sensor angular rate of rotation, and $\bar{f} = [f_1, f_2]$ represent the applied control forces. S is a skew-symmetric matrix. The equations of motion are written in the sensor-fixed coordinates denoted by $\bar{x} = [x_1, x_2]$ in FIGS. 3A and 3B.

Control forces are selected to drive $x_1$ into a sinusoidal response. This may be accomplished by a drive control loop or automatic gain control (AGC) loop 134 in FIG. 1. An example of an AGC loop is described in Y. C. Chen et al., "A Control and Signal Processing Integrated Circuit for the JPL-Boeing Micromachined Gyroscopes", *IEEE Transactions on Control Systems Technology*, Vol. 13, No. 2, March, 2005, the contents of which are incorporated herein by reference in their entirety. Rotation of the disc resonator gyroscope at angular rate $\Omega$ about a sense axis transfers momentum from one degree of freedom (DOF) into the other DOF of the disc resonator gyroscope resulting in a change in amplitude and phase of $x_2$. The sense axis extends out of the page from the origin 306 in FIGS. 3A and 3B. In a close-loop gyro sensor, the motion along $x_2$ is nullified by a second control loop, hereafter referred to as the Force-to-Rebalance loop, or the FTR loop 136 in FIG. 1.

A constant amplitude response along $x_1$ may be established by the AGC loop 134 so that $x_1 = A \cos \omega t$. Then the ideal actuator force $f_2$ along $x_2$ required for $x_2 \equiv 0$ is:

$$f_2 = A\alpha\Omega\cos\omega t + A(\hat{C}_1 - \hat{C}_2)\sin\theta_c\cos\theta_c\cos\omega t - A\frac{\omega_1^2 - \omega_2^2}{\omega}\cos\theta_k\sin\theta_k\sin\omega t \quad \text{(Eq. 2)}$$

where $\theta_c$ is the angle between principle damping axis and the sensor fixed axis, and $\theta_k$ the angle between principal stiffness axis and the sensor fixed axis. $\hat{C}_1$ and $\hat{C}_2$ are the principal damping constants, and $\omega_1$ and $\omega_2$ are the natural frequencies of the two in-plane modes. Note that the control forces, $f_1$ and $f_2$, are electrostatic forces applied via electrodes situated along the X1-Y1 and X2-Y2 axes.

Equation (2) can be separated into 3 components, each corresponding to a different physical phenomenon.

$$R = A\alpha\Omega\cos(\omega t) \quad \text{(Eq. 2a)}$$

This term may be referred to as the rate term, rate signal or angular rate. In a close-loop gyro system, the rate term is measured since it is linearly proportional to the input angular rate $\Omega$ modulated by the driving force $\cos(\omega t)$.

$$B = A(\hat{C}_1 - \hat{C}_2)\sin\theta_c\cos\theta_c\cos\omega t \quad \text{(Eq. 2b)}$$

This term may be referred to as the in-phase bias term or bias signal since it is modulated by the same cos ωt term as the rate term or signal. This term arises as a result of damping asymmetry ($\hat{C}_1 - \hat{C}_2$), and the misalignment between the drive axis and the natural damping axis, $\theta_c$.

$$Q = -A\frac{\omega_1^2 - \omega_2^2}{\omega}\cos\theta_k\sin\theta_k\sin\omega t \quad \text{(Eq. 2c)}$$

This may be referred to as the quadrature term or signal. The quadrature term or signal is due to asymmetry in sensor mass distribution and the stiffness matrix.

It is evident from equations (2a) through (2c) that damping asymmetry, mass imbalance, and stiffness asymmetry may all contribute to measurement error of the angular rate. Tuning electrodes may be placed at various locations around the disc resonator gyroscope 104 or 200. In a close-loop gyro system, the error term (quadrature) due to mass imbalance and stiffness asymmetry can be minimized by applying different electrostatic voltages around the disc resonator 104 or 200 to perturb the mechanical stiffness matrix M, since electrostatic force acting upon a small displacement can be linearized as a negative spring constant. These electrostatic voltages are determined as a function of the difference between natural frequencies, $\omega_1$ and $\omega_2$, and the angle between principal stiffness axis and the sensor fixed axis, $\theta_k$, such that $\omega_1 \approx \omega_2 \approx \omega$, and $\theta_k \approx 0$. A method for tuning a disc resonator is described in D. J. Kim et al., "A Systematic Method for Tuning the Dynamics of Electrostatically Actuated Vibratory Gyros," *IEEE Transactions on Control Systems Technology*, Vol. 4, No. 1, pp. 69-81 January 2006, the contents of which are incorporated herein by reference in their entirety.

In accordance with an embodiment of the disclosure as described herein, the rate and bias terms or signals (Equations 2a and 2b) may be isolated from quadrature by a 90 degree phase filter with respect to the drive signal A cos($\omega$t). However, gyro electronics may introduce a small amount of phase lag, and if not accounted for, will introduce significant coupling error. The determination of this additional phase angle is difficult. Further, any phase instability in the electronics will couple the quadrature term directly into the measurement error. Accordingly, minimization of quadrature may ensure the accuracy of a disc resonator gyroscope or vibratory gyroscope. Although quadrature is commonly minimized by tuning the electrostatic voltages as described above, small variations in the voltages will result in large quadrature change. Typically for a disc resonator gyroscope, the sensitivity to the tuning voltages is on the order of about 10 degrees/hour quadrature per millivolt.

Figure 4A:
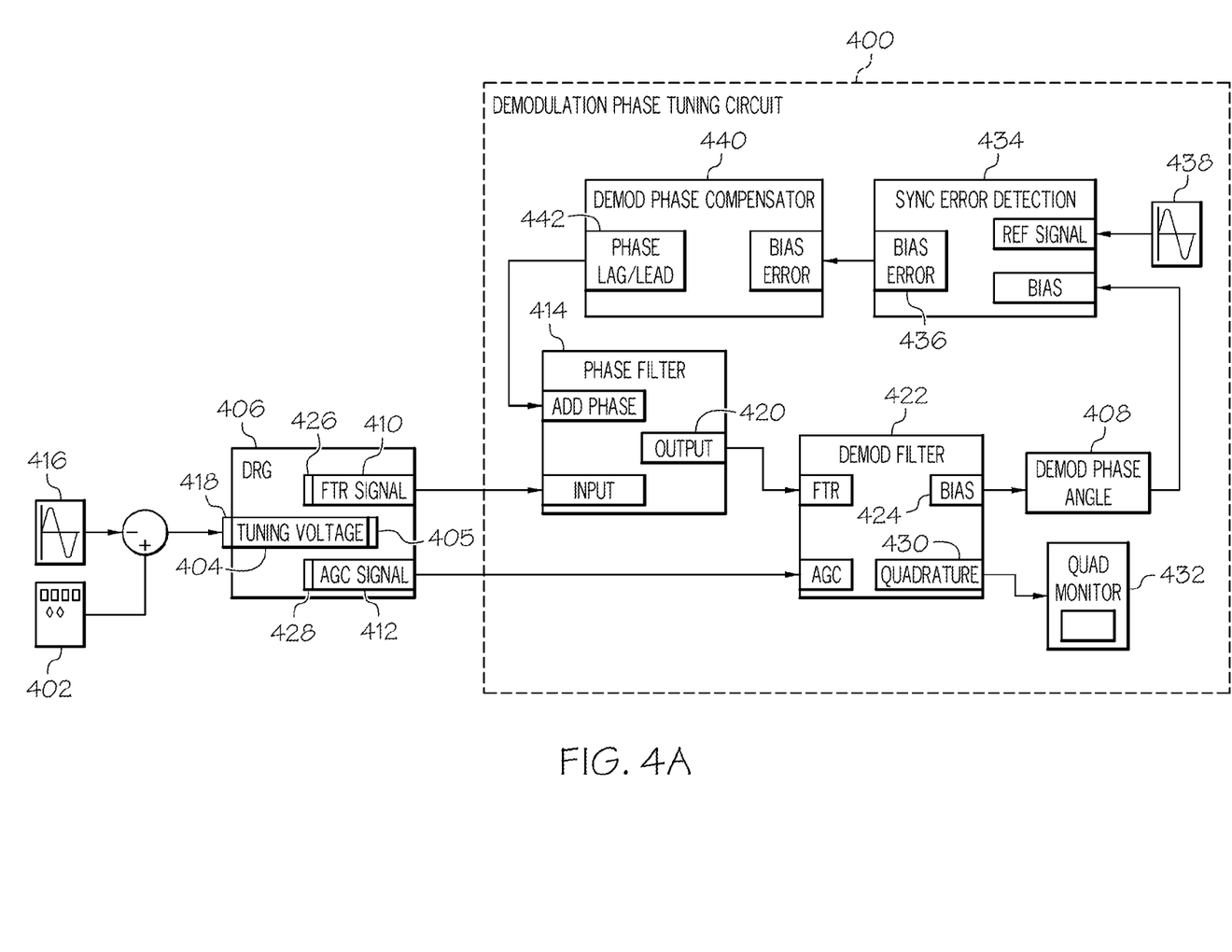
FIG. 4A is a block schematic diagram of an example of a demodulation phase tuning circuit in accordance with an embodiment of the present disclosure.

FIG. 4A is a block schematic diagram of an example of a demodulation phase tuning circuit 400 in accordance with an embodiment of the present disclosure. The demodulation phase tuning circuit 400 may be used for demodulation phase tuning circuit 128 in FIG. 1. A voltage source 402 may initially apply a tuning voltage 404 to the disc resonator gyroscope (DRG) 406 that may be determined a priori, such that $\omega_1 \approx \omega_2 \approx \omega$, and $\theta_k \approx 0$ in equation 2c. The demodulation phase tuning circuit 400 is configured to accurately determine or measure a demodulation phase angle 408 by demodulating an FTR signal 410 and an AGC signal 412 from the disc resonator gyroscope 406. In a close-loop system, the FTR signal 410 from an FTR loop, such as FTR loop 136 in FIG. 1, is demodulated with respect to the AGC signal 412 from an AGC loop, such as AGC loop 134 in FIG. 1. As evident from equation 2 above, the AGC signal 412 includes the term cos $\omega$t, while the FTR signal 410 includes a sum of cos $\omega$t and sin $\omega$t. The demodulation of the FTR signal 410 with respect to the AGC signal 412 separates the cosine term from the sine term in the FTR signal 410. In the absence of any induced phase lag, the demodulation phase angle 408 is ideally 90 degrees (phase difference between a cosine and a sine). But due to the different phase lags added by the AGC and FTR control electronics, the demodulation phase angle 408 may be differ by several degrees. To compensate for the difference, the FTR signal 410 may be passed through a phase filter 414 which may add a phase lead or lag to the FTR signal 410. The demodulation phase tuning circuit 400 and technique described herein takes advantage of the fact that the in-phase bias term or signal (equation 2b) is independent of stiffness asymmetry, but the quadrature term or signal (equation 2c) is highly sensitive to perturbation in stiffness. The phase filter 414 is automatically adjusted by the demodulation phase tuning circuit 400 to optimize the demodulation phase angle 408.

With the AGC loop 134 (FIG. 1) and the FTR loop 136 (FIG. 1) operational, and the disc resonator gyroscope 406 held at a substantially constant angular rate (a), a sinusoid perturbation voltage 416 may be applied to the tuning electrode 418 that induces a predetermined change in quadrature that is sufficiently large so that the induced perturbation in the quadrature signal is observable. In the disc resonator gyroscope 406, the tuning electrodes are oriented 22.5 degrees apart from the drive electrodes (i.e. the set of electrodes that drives the resonator into constant vibration). The frequency of the sinusoid perturbation voltage 416 or signal is chosen to be much less than the gyro bandwidth so the perturbation in quadrature can be observed. The gyro bandwidth refers to the overall bandwidth (both electrical and mechanical) of the two drive loops (AGC and FTR) to track the input angular rate up to a certain frequency. The amplitude of the sinusoid perturbation voltage 416 is chosen such that a sizable perturbation in quadrature is induced, while not too large to deviate significantly from the tuned electrostatic-mechanical equilibrium of the disc resonator gyroscope 406. As an example, the amplitude of the sinusoid perturbation voltage 416 may be about 1 to about 10 millivolts. The sinusoid perturbation voltage 416 signal is summed with the nominal tuning voltage and then applied to the tuning electrode 418.

An initial phase is assumed for the phase filter 414, typically about 0 degree. An output signal 420 of the phase filter 414 corresponding to a phase adjusted FTR signal is applied to a demodulation filter 422. The demodulation filter 422 is configured to generate a demodulated bias signal 424 in response to the FTR signal 410 from an FTR electrode 426 of the disc resonator gyroscope 406 and the AGC signal 412 from an AGC electrode 428 of the disc resonator gyroscope 406. A demodulated quadrature signal 430 may be monitored by a quad monitoring device 432. The FTR signal 410 is a sum of both sine and cosine terms. The AGC signal 412 is a pure sine term. The AGC signal 412 is fed into the demodulation filter 422 as a reference signal, and the FTR signal 410 is the input to be filtered. The demodulation filter 422 separates the input into two outputs: a pure sine signal and a pure cosine signal. This is what is referred to as demodulation. To do this, the precise phase angle of the mixed input signal needs to be known (the demodulation phase angle 408, or the phase difference between the AGC signal 412 and the FTR signal 410). In the absence of all electronic delays, bias error and quadrature error, this angle or the demodulation phase angle 408 is 90 degrees.

A synchronous error detection device 434 may receive the demodulated bias signal 424 from the demodulation filter 422. The synchronous error detection device 434 may be configured to measure a peak-to-peak variation of the demodulated bias signal 424 and generate a bias error signal 436 that corresponds to the peak-to-peak variation of the demodulated bias signal 424. The synchronous error detection device 434 is configured to compare the demodulated bias signal 424 to a reference signal 438 to measure the peak-to-peak variation of the demodulated signal 424. The reference signal 438 may be a sine reference wave.

A demodulation phase compensator 440 may receive the bias error signal 436 from the synchronous error detection device 434. The demodulation phase compensation 440 is configured to generate a demodulation phase angle adjustment signal 442 in response to the bias error signal 436. The demodulation compensator 440 may be configured to use a magnitude and polarity of the bias error signal 436 to generate the demodulation phase angle adjustment signal 442 that drives the bias error signal 436 to about zero. The demodulation phase angle adjustment signal 442 may be a phase lead or a phase lag adjustment. The phase filter 414 receives the demodulation phase angle adjustment signal 442 from the demodulation phase compensator 440. As previously discussed, the phase filter 414 is configured to automatically adjust a phase angle of the FTR signal 410 received as an input from the disc resonator gyroscope 406 in response to the demodulation phase angle adjustment signal 442. The phase filter 414 is configured to automatically adjust the phase angle of the FTR signal 410 to drive the bias error signal 436 to about zero. The in-phase bias term (equation 2b) and the quadrature term (equation 2c) of the equation of motion (equation 2) of the disc resonator gyroscope 406 are decoupled in response to the bias error signal 440 being zero. The in-phase bias term (equation 2b) and the quadrature term (equation 2c) are decoupled when the demodulation phase angle between the in-phase bias term and quadrature terms is optimum or 90 degrees which corresponds to the bias error signal 436 being zero.

This demodulation phase tuning circuit 400 may be applied once at start up as part of initialization sequence, and subsequently be turned off once the optimum demodulation phase angle is found. In an environment where the input angular rate of the disc resonator gyroscope varies only slowly, the demodulation phase tuning circuit 400 may remain operational during operation of the disc resonator gyroscope 406 to actively null phase errors.

Figure 4B:
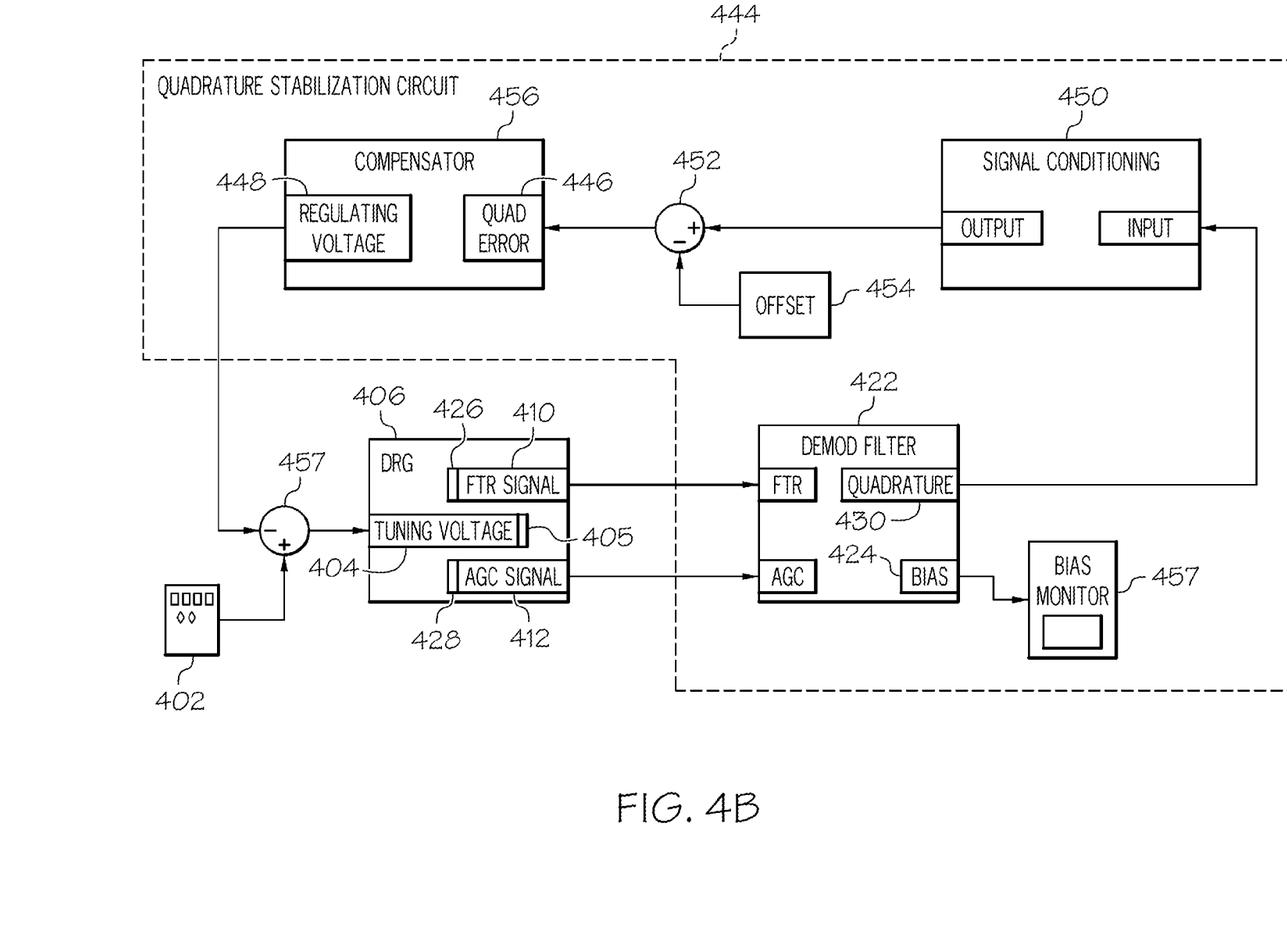
FIG. 4B is a block schematic diagram of an example of a quadrature stabilization circuit in accordance with an embodiment of the present disclosure.

FIG. 4B is a block schematic diagram of an example of a quadrature stabilization circuit 444 in accordance with an embodiment of the present disclosure. The quadrature stabilization circuit 444 may be used for the quadrature stabilization circuit 130 in FIG. 1. The voltage source 402 may be configured to apply a tuning voltage 404 to the tuning electrode 405 of the disc resonator gyroscope (DRG) 406 such that $\omega_1 \approx \omega_2 \approx \omega$, and $\theta_\tau \approx 0$ and the quadrature term (Equation 2c) is very close to zero. This configuration has the advantage that even if the demodulation phase angle contains a small error, the average quadrature bleed through is still about zero. However, quadrature is highly sensitive to even the slightest variation of the electrostatic tuning voltages. Electronic flicker and external temperature variation inevitably induce changes on the tuning voltage, which in turn causes quadrature to drift and vary over time. The quadrature stabilization circuit 444 or loop may be configured to maintain about a zero or constant quadrature to substantially cancel or minimize an effect of flicker in the turning voltage being applied to the tuning electrode 405.

The quadrature stabilization circuit 444 is configured to measure a quadrature error 446 and generate a quadrature regulating voltage 448 based on the quadrature error 446. The tuning voltage 404 may be adjusted by the quadrature regulating voltage 448 to cancel an effect of voltage flicker on the tuning voltage 404 before the tuning voltage 404 is applied to the tuning electrode 405 of the disc resonator gyroscope 406.

The quadrature stabilization circuit 444 may also include the demodulation filter 422 also used in the demodulation phase tuning circuit 400 in FIG. 4A. In another embodiment, the quadrature stabilization circuit 444 may use another demodulation filter or another device for demodulating the FTR signal 410 and the AGC signal 412 from the disc resonator gyroscope 406. The demodulated quadrature signal 430 from the demodulation filter 422 may be feedback as a quadrature error signal 446. The demodulated quadrature signal 430 may be feedback after the correct demodulation phase angle 408 has been established by the demodulation phase tuning circuit 400 in FIG. 2A.

The quadrature stabilization circuit 444 may include a signal conditioning device 450 for conditioning the demodulated quadrature signal 430 from the demodulation filter 422. The signal conditioning device 450 may be a low pass filter to remove high frequency noise. The signal conditioning device 450 may be configured to pass signals less than about 30 Hertz.

The quadrature stabilization circuit 444 may also include a mechanism 452 or signal summing device to subtract (or add) a constant offset signal 454 from the conditioned demodulated quadrature signal 430 from the signal conditioning device 450 to generate the quadrature error signal 446. The demodulated quadrature signal 430 may be conditioned and the constant offset signal 454 subtracted (or added) from the signal 430 so that the quadrature stabilization circuit 444 can drive the demodulated quadrature signal to a non-zero value if needed.

The quadrature stabilization circuit 444 may also include a compensator 456 configured to generate the quadrature regulating voltage 448 in response to the quadrature error signal 446. The quadrature regulating voltage 448 may be added to or subtracted from the tuning voltage 402 in a signal summing circuit 457 to cancel the effect of voltage flicker before the tuning voltage 404 is applied to the tuning electrode 405 of the disc resonator gyroscope 406. Voltage flicker may be defined and fluctuation in the amplitude of the tuning voltage 402 or other instability that may affect accurate operation of the disc resonator gyroscope 406. Because the quadrature signal 430 is very noisy, and voltage flicker has very large time constants, the compensator 456 may be a simply proportional integral (PI) compensator used to produce the regulating voltage 448. However any compensator may be designed to suit the characteristics of the quadrature signal 430.

The demodulated bias signal 424 may be monitored by a monitoring device or bias monitor 457.

Figure 4C:
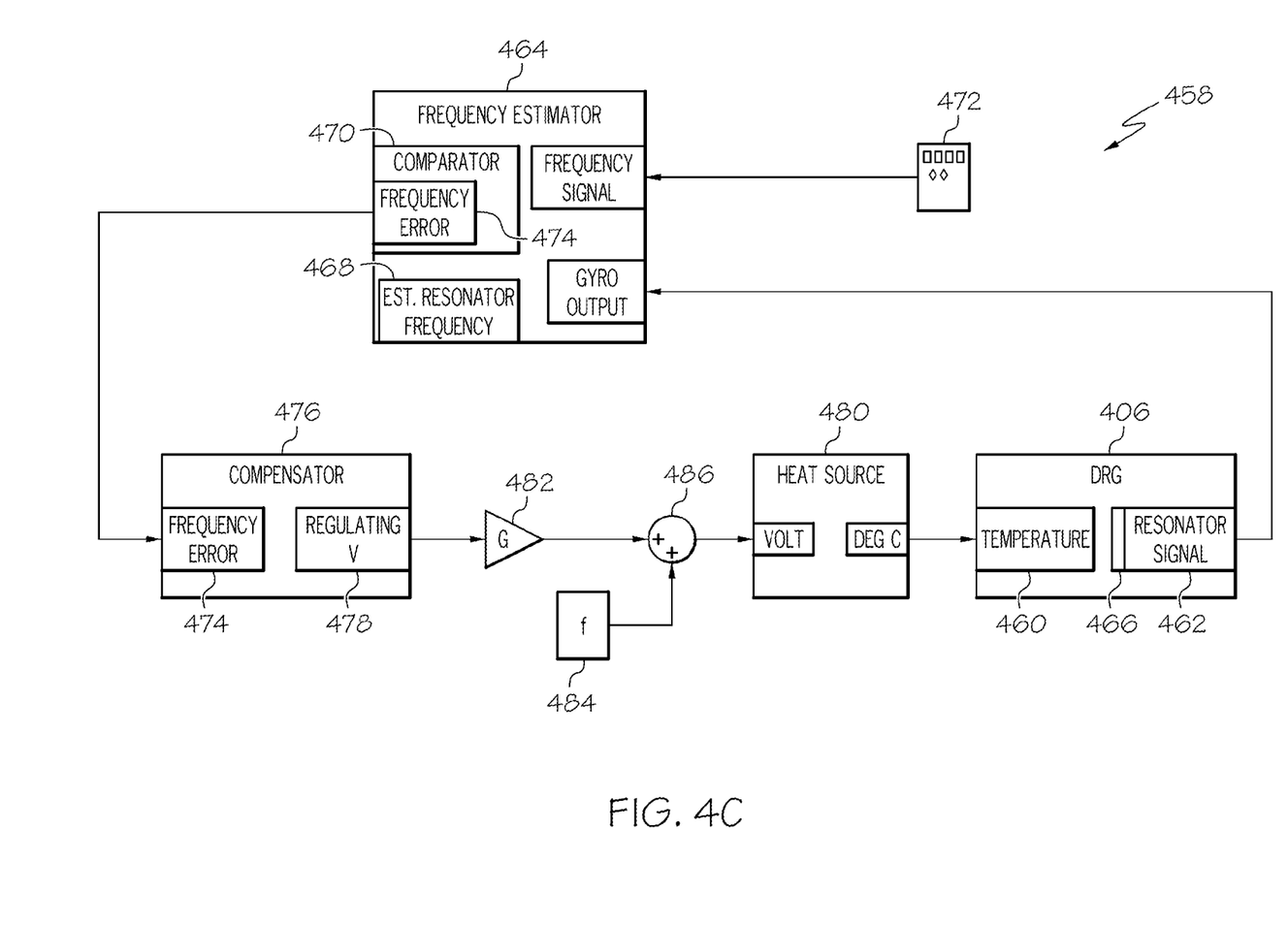
FIG. 4C is a block schematic diagram of an example of a frequency stabilization circuit in accordance with an embodiment of the present disclosure.

FIG. 4C is a block schematic diagram of an example of a frequency stabilization circuit 458 in accordance with an embodiment of the present disclosure. The frequency stabilization circuit 458 may be configured to maintain an operating frequency of the disc resonator gyroscope 406 substantially constant. The frequency stabilization circuit 458 is configured to control a temperature 460 of the disc resonator gyroscope 406 in response to an output resonator operating signal 462 from the disc resonator gyroscope 406. The output resonator operating signal 462 corresponds to the operating frequency of the disc resonator gyroscope 406. From equation (2c), the quadrature term is proportional to $$\frac{\omega_1^2 - \omega_2^2}{\omega}.$$

This term can be written as $$\frac{\Delta\omega}{2\omega}, \text{ where } \Delta\omega = \omega_1 - \omega_2, \omega = \frac{1}{2}(\omega_1 + \omega_2).$$

Through thermal-elastic coupling, $$\frac{\Delta\omega}{\omega}$$

depends linearly on temperature to the first order. If uncompensated, temperature induced quadrature error will enter the quadrature stabilization circuit 444 and be treated as a tuning voltage disturbance. This may introduce a gross error in the quadrature stabilization circuit 444. Therefore, for the quadrature stabilization circuit 444 to work in a prescribed and predictable manner, a frequency of the disc resonator gyroscope 406 will need to be kept constant. The disc resonator gyroscope 406 is driven at a resonate frequency and this frequency is preferably remains constant. The gyro resonate frequency may be about 15 kilohertz. This may be achieved through the frequency stabilization circuit 458.

The frequency stabilization circuit 458 may include a frequency estimator 464 configured to receive the output resonator operating signal 462 from an output electrode 466 of the disc resonator gyroscope 406. The output resonator operating signal 462 may correspond to the term $x_1 = A \cos \omega t$ in equation 1. The frequency estimator 464 is also configured to estimate a resonator frequency 468 based on the output resonator operating signal 462.

The frequency estimator 464 may include a comparator 470 to determine a difference between a stable frequency reference 472 and the estimated resonator frequency 468. The comparator 470 may provide a frequency error signal 474 corresponding to a difference between the stable frequency reference 472 and the estimated resonator frequency 468. The stable frequency reference 472 may be an ovenized quartz clock or an atomic clock for example.

The frequency stabilization circuit 458 may also include a compensator 476 to receive the frequency error signal 474 from the frequency estimator 464. The compensator 476 may be configured to generate a frequency regulating voltage 478 in response to the frequency error signal 474.

The frequency stabilization circuit 458 may further include a heat source 480 powered using the frequency regulating voltage 478. The frequency regulating voltage 478 may be amplified by a predetermined gain (G) by an amplifier 482. The amplified regulating voltage 478 may be offset by a selected frequency offset 484 in a mixer 486 or summing device before being used to controllably power the heat source 480. The selected offset 484 may be introduced to the frequency regulating voltage 478 to provide a suitable controllable temperature range by the heat source 480. Accordingly, the frequency regulating voltage 478 may be regulated in response to the resonator output signal 462. The heat source 480 controls the temperature 460 of the disc resonator gyroscope 406 in response to the frequency regulating voltage 478 and thereby maintains the operating frequency of the disc resonator gyroscope 460 substantially constant. As previously discussed, the operating frequency or resonate frequency of the disc resonator gyroscope 460 may be about 15 KHz.

The heat source 480 is preferably located as close to the disc resonator gyroscope 406 as possible. The heat source 480 is preferably isolated so that outside disturbance will not overwhelm the heat source 480 which will improve control authority of the operating frequency of the disc resonator 406. The heat source 480 is configured to reject external temperature disturbance to maintain the frequency constant.

Figure 5A:
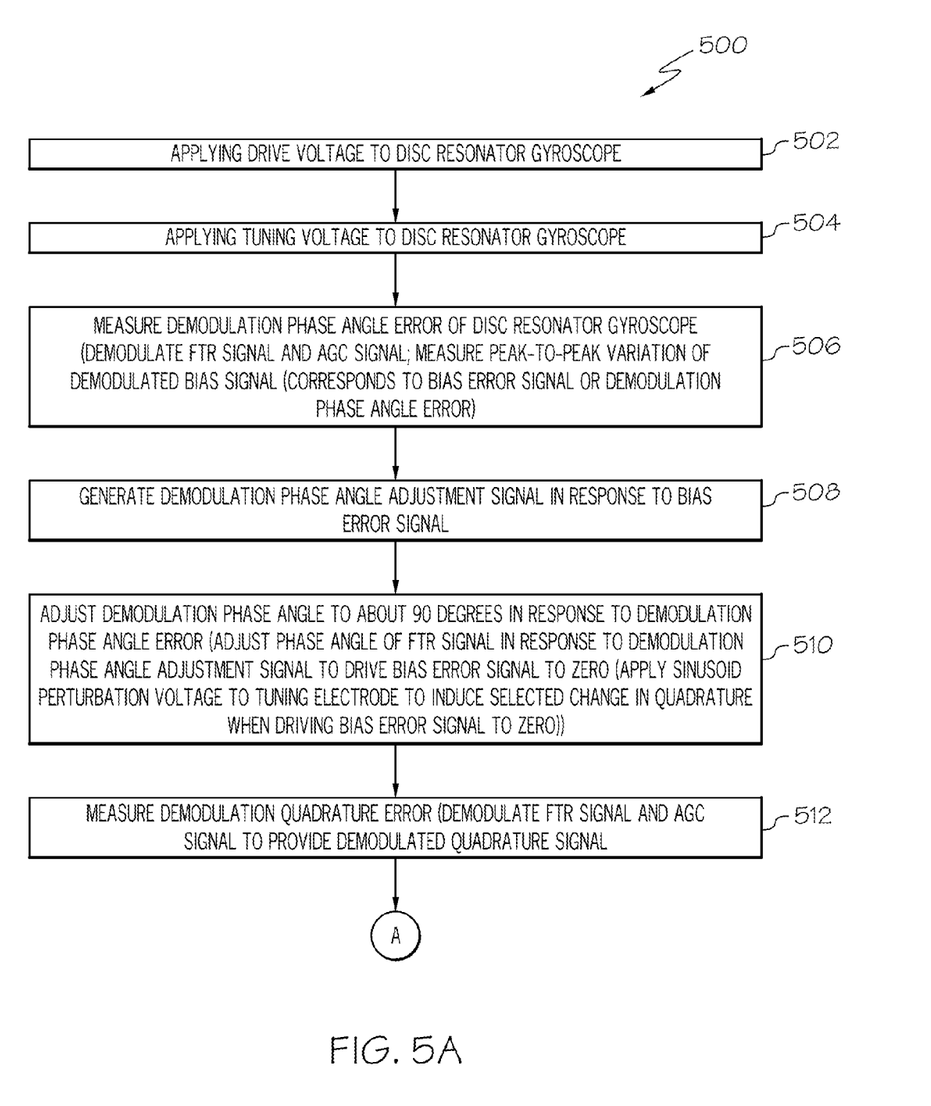
FIGS. 5A and 5B (collectively FIG. 5) are a flow chart of an example of a method for gyroscope quadrature stabilization and demodulation phase error nulling in accordance with an embodiment of the present disclosure.
Figure 5B:
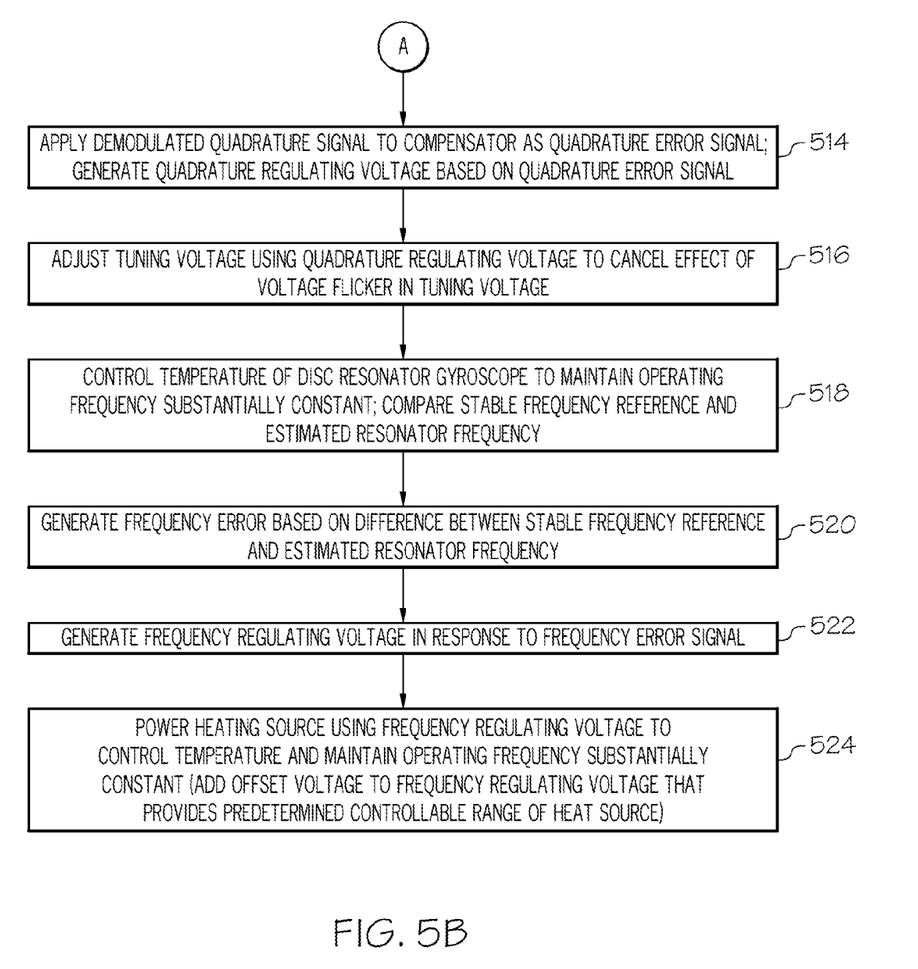

FIGS. 5A and 5B (collectively FIG. 5) are a flow chart of an example of a method 500 for gyroscope quadrature stabilization and demodulation phase error nulling in accordance with an embodiment of the present disclosure. In block 502, a drive voltage or voltages may be applied to a drive electrode or electrodes of a disc resonator gyroscope. In block 504, one or more tuning voltages may be applied to a tuning electrode or electrodes of the disc resonator gyroscope. The tuning voltage or voltages may be determined a priori, such that $\omega_1 \approx \omega_2 \approx \omega$ and $\theta k \approx 0$ in equation 2 above.

In block 506, a demodulation phase angle error of the disc resonant gyroscope may be measured. The phase angle error of the disc resonator gyroscope may be measured by demodulating an FTR signal and an AGC signal from the disc resonator gyroscope to produce a demodulated bias signal or rate signal and a demodulated quadrature signal. A peek-to-peak variation of the demodulated bias signal or rate signal may be measured and feedback as a bias error signal. The peak-to-peak variation of the demodulated bias signal may be measured by comparing the demodulated bias signal to a reference signal to generate the bias error signal. The bias error signal corresponds to a modulation phase angle error.

In block 508, a demodulation phase angle adjustment signal may be generated in response to the bias error signal. The demodulation phase angle adjustment signal may be generated in a demodulation phase compensator.

In block 510, the demodulation phase angle may be adjusted to about 90 degrees in response to the demodulation phase angle error. The demodulation phase angle may be adjusted to about 90 degrees by adjusting the phase angle of the FTR signal from the disc resonator gyroscope to drive the bias error signal to about zero.

Also in block 510, a sinusoid perturbation voltage may be applied to the tuning electrode of the disc resonator gyroscope to induce a selected change in quadrature when driving the bias error signal to zero. A frequency of the sinusoid perturbation voltage may be chosen to be much less than the mechanical bandwidth of the disc resonator so that the perturbation in quadrature may be observed. The amplitude of the sinusoid perturbation voltage may be chosen such that a sizable perturbation in quadrature is induced, while not too large to deviate significantly from the tuned electrostatic-mechanical equilibrium of the disc resonator. This amplitude may be about 1-10 mV. The sinusoid perturbation signal is summed with the nominal tuning voltage and then applied to the tuning electrode of the disc resonator.

In block 512, the demodulation quadrature error may be measured. The demodulation quadrature error may be measured by demodulating the FTR signal and the AGC signal from the disc resonator to provide a demodulated quadrature signal. Similar to that previously described, the demodulated quadrature signal may be conditioned and fed back as a quadrature error signal. An offset signal may be subtracted from or added to the quadrature error signal to drive the quadrature error signal to a nonzero value.

In block 514, the offset quadrature error signal may be applied to a compensator to generate a quadrature regulating voltage based on the quadrature error signal. In block 516, the tuning voltage may be adjusted using the quadrature regulating voltage to cancel the effect of voltage flicker in the tuning voltage.

In block 518, a temperature of the disc resonator gyroscope may be controlled to maintain the operating frequency of the disc resonator gyroscope substantially constant. A stable frequency reference may be compared with an estimated resonator frequency of the disc resonator. In block 520, a frequency error signal may be generated based on the difference between the stable frequency reference and the estimated resonator frequency.

In block 522, a frequency regulating voltage may be generated in response to the frequency error signal. The frequency regulating voltage may be generated by a compensator in response to the frequency error signal.

In block 524, a heating source may be powered using the frequency regulating voltage to control the temperature of the disc resonator. By controlling the temperature of the disc resonator, the operating frequency of the disc resonator may be maintained substantially constant. An offset voltage may be added to the frequency regulating voltage in order to provide a predetermined controllable heat range of the heat source.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the embodiments herein have other applications in other environments. This application is intended to cover any adaptations or variations of the present disclosure. The following claims are in no way intended to limit the scope of the disclosure to the specific embodiments described herein.

What is claimed is:

1. A gyroscope system, comprising:
   a disc resonator gyroscope comprising a plurality of electrodes embedded in the disc resonator gyroscope, wherein the electrodes are configured for at least applying a drive voltage and a tuning voltage to the disc resonator gyroscope and for sensing operating parameters of the disc resonator gyroscope;
   a force-to-rebalance (FTR) loop associated with the disc resonator gyroscope that senses an FTR signal from the disc resonator gyroscope;
   an automatic gain control (AGC) loop associated with the disc resonator gyroscope that senses an AGC signal from the disc resonator gyroscope; and
   a quadrature stabilization circuit configured to measure a quadrature error signal and generate a quadrature regulating voltage based on the quadrature error signal, wherein the quadrature error signal is measured using the FTR signal and the AGC signal and wherein the tuning voltage is adjusted by the quadrature regulating voltage to cancel an effect of voltage flicker on the tuning voltage before the tuning voltage is applied to a tuning electrode of the disc resonator gyroscope.

2. The gyroscope system of claim 1, further comprising a demodulation phase tuning circuit configured to measure a demodulation phase angle error of the disc resonator gyroscope and to adjust the demodulation phase angle to about 90 degrees.

3. The gyroscope system of claim 1, further comprising a frequency stabilization circuit configured to maintain an operating frequency of the disc resonator gyroscope substantially constant.

4. The gyroscope system of claim 1, wherein the quadrature stabilization circuit comprises a demodulation filter and wherein the AGC signal is fed into the demodulation filter as a reference signal and the FTR signal is filtered by the demodulation filter, the demodulation filter provides a demodulated quadrature signal and a demodulated bias signal.

5. The gyroscope system of claim 4, wherein the quadrature stabilization circuit further comprises a signal conditioning device that removes noise greater than a predetermined frequency from the demodulated quadrature signal and provides a conditioned demodulated quadrature signal.

6. The gyroscope system of claim 5, wherein the quadrature stabilization circuit further comprises:
   a mechanism to apply a constant offset voltage signal to the conditioned demodulated quadrature signal to provide the quadrature error signal; and
   a compensator configured to generate the quadrature regulating voltage in response to the quadrature error signal.

7. A gyroscope system, comprising:
   a disc resonator gyroscope comprising a plurality of electrodes embedded in the disc resonator gyroscope, wherein the electrodes are configured for at least applying a drive voltage and a tuning voltage to the disc resonator gyroscope and for sensing operating parameters of the disc resonator gyroscope, wherein the plurality of electrodes comprise:
      a force-to-rebalance (FTR) electrode that senses an FTR signal; and
      an automatic gain control (AGC) electrode that senses an AGC signal;
   a demodulation phase tuning circuit configured to measure a demodulation phase angle error of the disc resonator gyroscope using the FTR signal and the AGC signal and to adjust a demodulation phase angle to about 90 degrees; and
   a quadrature stabilization circuit configured to measure a quadrature error and generate a quadrature regulating voltage based on the quadrature error, wherein the quadrature error is measured using the FTR signal and the AGC signal and wherein the tuning voltage is adjusted by the quadrature regulating voltage to cancel an effect of voltage flicker on the tuning voltage before the tuning voltage is applied to a tuning electrode of the disc resonator gyroscope.

8. The gyroscope system of claim 7, further comprising a frequency stabilization circuit configured to maintain an operating frequency of the disc resonator gyroscope substantially constant.

9. The gyroscope system of claim 8, wherein the frequency stabilization circuit is configured to control a temperature of the disc resonator gyroscope in response to an output resonator operating signal from the disc resonator gyroscope that corresponds to the operating frequency of the disc resonator gyroscope.

10. The gyroscope system of claim 8, wherein the frequency stabilization circuit comprises:
   a frequency estimator configured to receive an output resonator operating signal from an output electrode of the disc resonator gyroscope and to estimate a resonator frequency based on the output resonator operating signal, the output resonator operating signal corresponding to the operating frequency of the disc resonator gyroscope;
a comparator to determine a difference between a stable frequency reference and the estimated resonator frequency, wherein the comparator provides a frequency error signal corresponding to the difference between the stable frequency reference and the estimated resonator frequency;
a compensator configured to generate a frequency regulating voltage in response to the frequency error signal; and
a heat source powered using the frequency regulating voltage, wherein the heat source controls a temperature of the disc resonator gyroscope in response to the frequency regulating voltage for maintaining the operating frequency of the disc resonator gyroscope substantially constant.

11. The gyroscope system of claim 10, further comprising a voltage generator configured to add an offset voltage to the frequency regulating voltage that provides a predetermined controllable range of operation of the heat source.

12. The gyroscope system of claim 7, wherein the demodulation phase tuning circuit comprises:
a demodulation filter configured to generate a demodulated bias signal in response to the FTR signal from the FTR electrode of the disc resonator gyroscope and the AGC signal from the AGC electrode of the disc resonator gyroscope;
a synchronous error detection device configured to measure a peak-to-peak variation of the demodulated bias signal and generate a bias error signal that corresponds to the peak-to-peak variation of the demodulated bias signal;
a demodulation phase compensator configured to generate a demodulation phase angle adjustment signal in response to the bias error signal; and
a phase filter configured to adjust a phase angle of the FTR signal in response to the demodulation phase angle adjustment signal to drive the bias error signal to about zero, an in-phase bias term and a quadrature term of an equation of motion of the disc resonator gyroscope are decoupled in response to the bias error signal being zero.

13. The gyroscope system of 12, wherein the demodulation compensator is configured to use a magnitude and polarity of the bias error signal to generate the demodulation phase angle adjustment signal that drives the bias error signal to about zero.

14. The gyroscope system of claim 12, wherein the synchronous error detection device is configured to compare the demodulated bias signal to a reference signal to measure the peak-to-peak variation of the demodulated bias signal.

15. The gyroscope system of claim 12, wherein the quadrature stabilization circuit comprises:
the demodulation filter configured to generate a demodulated quadrature signal in response to the FTR signal and the AGC signal, the demodulated quadrature signal being feedback as a quadrature error signal;
a compensator configured to generate a quadrature regulating voltage in response to the quadrature error signal, wherein the quadrature regulating voltage is added to the tuning voltage to cancel an effect of voltage flicker before the tuning voltage is applied to the tuning electrode of the disc resonator gyroscope.

16. The gyroscope system of claim 15, wherein the bias error signal is driven to about zero before the quadrature regulating voltage is applied to the tuning electrode.

17. The gyroscope system of claim 7, wherein a sinusoid perturbation voltage is applied to the tuning electrode of the disc resonator gyroscope to induce a selected change in quadrature when driving the bias error signal to about zero, a frequency of the sinusoid perturbation voltage being chosen with respect to a mechanical bandwidth of the disc resonator gyroscope and an amplitude of the sinusoid perturbation voltage being chosen to induce a predetermined perturbation in quadrature without deviating from a tuned electrostatic-mechanical equilibrium of the disc resonator gyroscope, the sinusoid perturbation voltage is summed with the tuning voltage for applying to the tuning electrode.

18. A method, comprising:
applying a drive voltage to a drive electrode of a disc resonator gyroscope;
applying a tuning voltage to a tuning electrode of the disc resonator gyroscope;
measuring a demodulation phase angle error of the disc resonator gyroscope;
adjusting a demodulation phase angle to about 90 degrees in response to the demodulation phase angle error measurement;
measuring a demodulation quadrature error, wherein measuring the demodulation quadrature error comprises:
sensing a force-to-rebalance (FTR) signal by an FTR electrode of the disc resonator gyroscope; and
sensing an automatic gain control (AGC) signal by an AGC electrode of the disc resonator gyroscope;
generating a quadrature regulating voltage based on the demodulation quadrature error; and
adjusting the tuning voltage using the quadrature regulating voltage to cancel an effect of voltage flicker of the tuning voltage being applied to the tuning electrode.

19. The method of claim 18, further comprising controlling a temperature of the disc resonator gyroscope to maintain an operating frequency of the disc resonator gyroscope substantially constant, wherein the temperature of the disc resonator gyroscope is controlled by a heat source in response to an output operating signal from the disc resonator gyroscope that corresponds to an operating frequency of the disc resonator gyroscope.

20. The method of claim 19, further comprising:
comparing a stable frequency reference and an estimated resonator frequency;
generating a frequency error signal based on a difference between the stable frequency reference and the estimated resonator frequency;
generating a frequency regulating voltage in response to the frequency error signal;
powering the heat source using the frequency regulating voltage; and
adding an offset voltage to the frequency regulating voltage that provides a predetermined controllable range of operation of the heat source.

21. The method of claim 18, further comprising:
demodulating the FTR signal and the AGC signal from the disc resonator gyroscope to provide a demodulated bias signal;
measuring a peak-to-peak variation of the demodulated bias signal, the measured peak-to-peak variation of the demodulated bias signal corresponding to a bias error signal;

generating a demodulation phase angle adjustment signal in response to the bias error signal; and adjusting a phase angle of the FTR signal in response to the demodulation phase angle adjustment signal to drive the bias error signal to zero, an in-phase bias term and a quadrature term of an equation of motion of the disc resonator gyroscope are decoupled in response to the error signal being zero.

22. The method of claim 21, further comprising applying a sinusoid perturbation voltage to the tuning electrode of the disc resonator gyroscope to induce a selected change in quadrature when driving the bias error signal to about zero, a frequency of the sinusoid perturbation voltage being chosen with respect to a mechanical bandwidth of the disc resonator gyroscope and an amplitude of the sinusoid perturbation voltage being chosen to induce a predetermined perturbation in quadrature without deviating from a tuned electrostatic-mechanical equilibrium of the disc resonator gyroscope, the sinusoid perturbation voltage is summed with the tuning voltage for applying to the tuning electrode.

23. The method of claim 21, further comprising
demodulating the FTR signal and the AGC signal from the disc resonator gyroscope to provide a demodulated quadrature signal;

receiving the demodulated quadrature signal by a compensator as a quadrature error signal; and generating a quadrature regulating voltage in response to the quadrature error signal, wherein the quadrature regulating voltage is added to the tuning voltage to cancel the effect of voltage flicker of the turning voltage being applied to the tuning electrode of the disc resonator gyroscope.

24. The method of claim 18, wherein measuring the demodulation quadrature error further comprises:

demodulating the FTR signal and the AGC signal from the disc resonator gyroscope to provide a demodulated quadrature signal; and feeding back the demodulated quadrature signal for measuring the demodulation quadrature error after a correct demodulation phase angle is established.

* * * * *